United States Patent [19]

Hayashi et al.

[11] Patent Number: 5,345,072
[45] Date of Patent: Sep. 6, 1994

[54] FOCUS DETECTION DEVICE FOR READING INFORMATION FROM AN OPTICAL RECORDING MEDIUM

[75] Inventors: Hideki Hayashi, Katano; Shinichi Tanaka, Kyoto; Sadao Mizuno, Ibaraki; Noboru Ito, Hirakata; Yoshiaki Komma, Kyoto, all of Japan

[73] Assignee: Matsushita Electric Industrial Co., Ltd., Osaka, Japan

[21] Appl. No.: 997,293

[22] Filed: Dec. 23, 1992

[30] Foreign Application Priority Data

Dec. 24, 1991 [JP] Japan .................................. 3-340629
Aug. 24, 1992 [JP] Japan .................................. 4-223776

[51] Int. Cl.⁵ ........................... G01J 1/20; G11B 7/00
[52] U.S. Cl. ................................ 250/201.5; 367/44.37
[58] Field of Search ............ 250/201.4, 201.5, 201.6, 250/570, 216; 356/4; 369/44.11, 44.37, 44.38, 44.41

[56] References Cited

U.S. PATENT DOCUMENTS 3,992,574 11/1976 Bouwhuis et al. ........... 250/201.5 X
4,973,836 11/1990 Matsuoka .......................... 250/201.5
5,105,076 4/1992 Premji .............................. 250/201.5

Primary Examiner—David C. Nelms
Assistant Examiner—John R. Lee
Attorney, Agent, or Firm—Ratner & Prestia

[57] ABSTRACT

A focus detection device for use in a focus detection device includes a main light source and two auxiliary light sources. These auxiliary light sources are offset to the main light source along the optical axis of the main optical system while being symmetrically positioned perpendicular to the optical axis. A exposure units having apertures are provided above the two auxiliary light sources for constricting the amount of auxiliary lights so that the convergence of the auxiliary beams on the optical disk is less than that of the main light beam. As a result, an optical system with a broad focus error detection range can be constructed while increasing the convergence of the main light beam.

12 Claims, 17 Drawing Sheets

Af   Am

Af   Am

FOCUS DETECTION DEVICE FOR READING INFORMATION FROM AN OPTICAL RECORDING MEDIUM

BACKGROUND OF THE INVENTION

1. Field of the Invention

The present invention relates to a focus detection device for use in an optical disk apparatus and, more particularly, to a focus detection device for which the focus detection sensitivity can be freely set. In addition, the convergence on the data recording medium of the main optical system can be freely set during the focus detection sensitivity adjustment. It is also possible to reduce the cross-track noise of the focus error signal.

2. Description of the Prior Art

An example of conventional focus error detection method which Japanese patent laid-open number S50-78341 propose is shown in FIG. 23. The circular recording medium 1 is mounted on a rotational drive motor 4 with the motor spindle passing through a center hole 2 thereof. The reading light beam 10 emitted from a light source 5 is focused by a lens 7 on the recording track 3 formed on the surface of the circular recording medium 1. The reading light beam 10 is modulated by the recording track 3, reflected from the disk 1 through the lens 7 and off the half mirror 6, and focused on the photodetector 8. The optical system described in the above is hereinafter referred to as a "main optical system." The main optical system has a main optical axis Ap. The audio, visual, or other data recorded to the circular recording medium 1 is reproduced by demodulating the playback signal obtained by this main optical system.

This device comprises two auxiliary light sources 5a and 5b in addition to the main light source 5. These auxiliary light sources 5a and 5b are offset on opposite sides of the main light source 5 asymmetrically. The auxiliary light sources 5a and 5b are also offset to the main light source 5 with respect to the main optical axis Ap. As with the main optical system, the light beams emitted from the auxiliary light sources 5a and 5b are modulated by the recording track 3 of the recording medium 1, and are focused on the photodetectors 8a and 8b, respectively. These optical system described in the above are hereinafter referred to as "auxiliary optical systems."

In FIG. 24, the change in the modulation factor m of the playback signals caused by a given focus shift z is shown. The curves $M_0'$, $Ma'$, and $Mb'$ represent signals produced by photodetectors 8, 8a, and 8b, respectively. When the main optical system is focused on the recording medium 1, i.e., when z=0, the modulation factor m in the playback signal of the photodetector 8 is an extremely high value A', and the modulation factors m in the playback signals of the auxiliary photodetectors 8a and 8b are the same low value B' for both signals.

When the main optical system is focused at a point before the surface of the recording medium 1, i.e., when z<0, the modulation factor m in the playback signal of one auxiliary photodetector 8b is the value C' which is greater than the value D in the playback signal of the other auxiliary photodetector 8b. Conversely, when the main optical system is focused at a point beyond the surface of the recording medium 1, i.e., when z>0, the modulation factor m in the playback signal of the one auxiliary photodetector 8a is the value E' which is less than the value F' in the playback signal of the other auxiliary photodetector 8b.

The focus error signal can thus be obtained from the difference between the modulation factor in the playback signals from the two auxiliary photodetectors 8a and 8b, and it is also possible to correct the convergence of the lens 7.

However, the photodetection sensitivity and range in the above described method is inevitably determined by the main optical system, and cannot be readily adjusted. In particular, if the convergence of the main optical system is increased in order to read and write high density media, the convergence of the auxiliary optical system is also boosted, effectively narrowing the focus error detection range. This technology is also limited by cross-track noise, which is created when the beams move laterally across the data tracks, being mixed with the focus error signal.

SUMMARY OF THE INVENTION

The object of the present invention is therefore to provide an imaging device which solves these problems.

The present invention has been developed with a view to substantially solving the above described disadvantages and has for its essential object to provide an improved focus detection device.

In order to achieve the aforementioned objective, a focus detection device for use in an optical disk apparatus for reading and writing an information on and from an optical recording medium having a recording track formed thereon, said device comprises a first light emission means for emitting a first light beams in a first direction toward the optical disk; a converging means provided between the optical recording medium and the first emission means for conversing the first beam to make a first spot focused on the recording track; a second light emission means provided on a first side of the first light emission means for emitting a second light beam such that the emitted second light beam is focused by the converging means beyond the optical recording medium to make a second spot having a first predetermined diameter around recording track; a first light restriction means provided in a path of second emitted light beam adjacent the second light emission means for restricting the amount of the second emitted light beam passing therethrough; a third light emission means provided on a second side of the first light emission means for emitting a third light beam such that the emitted third light beam is focused by the converging means above the optical recording medium to make a third spot having a second predetermined diameter around the recording track, the first and second sides being opposite to each other, the second predetermined diameter being vertically same as the first predetermined diameter when the first spot being in focus on the recording track, the second and third spots being located on opposite sides of the first spot (SO); a second light restriction means provided in a path of the third emitted light beam adjacent the third light emission means for restricting the amount of the second emitted light beam passing therethrough; a beam guide means located between the converging means and the optical recording medium for guiding the first, second, and third light beams reflected from optical recording medium in a second direction; a first photodetection means inserted in a path of the guided first light beam for receiving the guided first light beam to produce an information signal representing information recorded on the recording track; a second photodetection means inserted in a path of the guided second light beam for receiving the guided second light beam and producing a first focus signal; and a third photodetection means inserted in a path of the guided third light beam for receiving the guided third light beam and producing a second focus signal.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
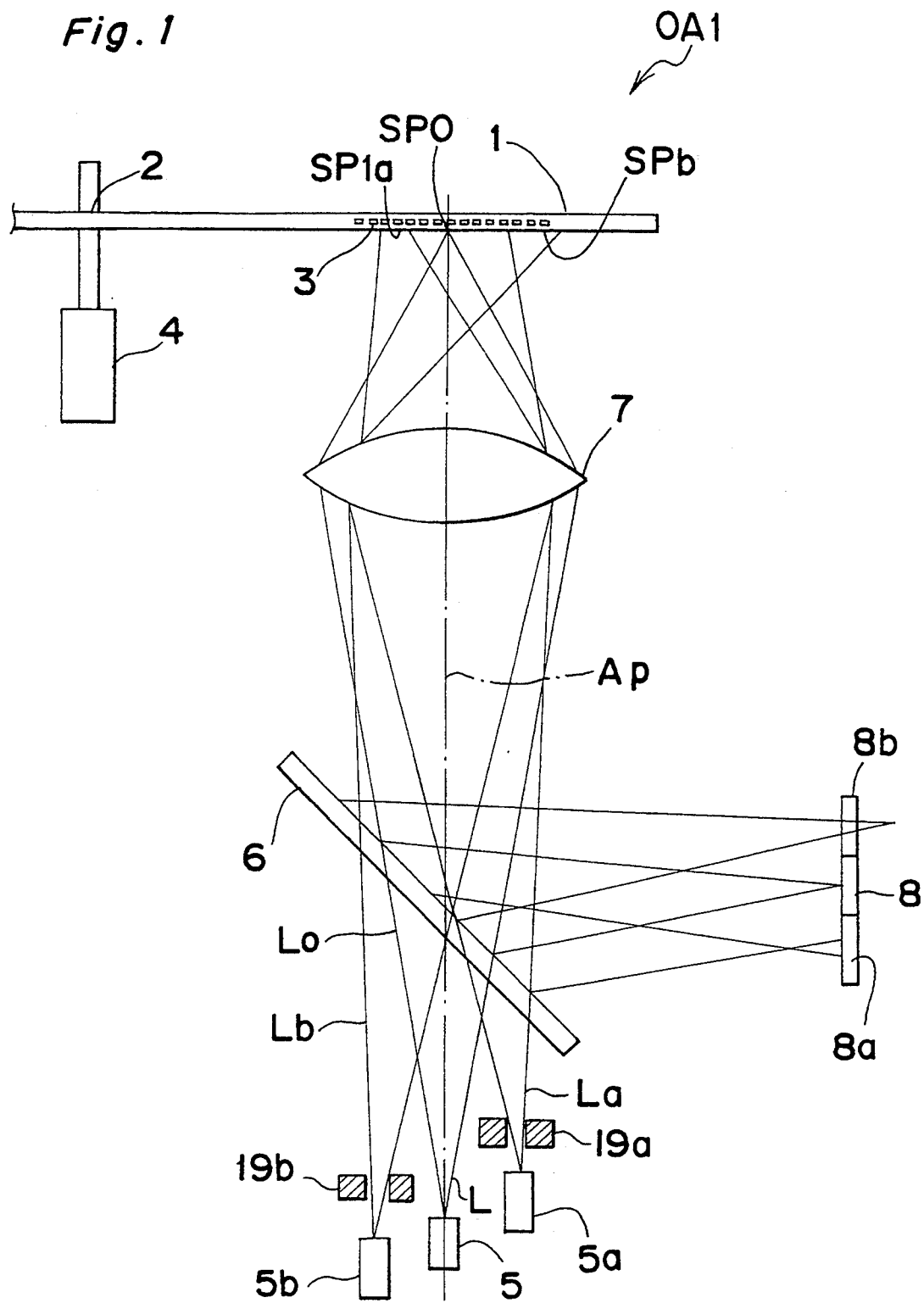
FIG. 1 is a block diagram of a focus detection device according to a first embodiment of the present invention.

Referring to FIG. 1, a focus detection device according to a first embodiment of the present invention used in the three beam focus error detection method is shown. The focus detection device OA1 includes a support unit 4 for rotatably supporting an optical disk 1 having a center hole 2. The optical disk 1 has a main plane formed with a recording track 3 for recording the information thereon. The focus detection device OA1 further includes a main light source 5 for emitting a main light beam L in a first direction toward the optical disk 1. In the path of the emitted light beam L between the optical disk 1 and the main light source 5, a condenser lens 7 having an optical axis Ap is provided for converging the main light beam L to make a light spot SP focused on the track 3. In the path of the reflected light beam L from the optical disk 1 through the condenser lens 7, a half mirror 6 is provided with its main plane across the optical axis Ap at a predetermined angle so that the half mirror 6 reflects the light L coming from the condenser lens 7 in a second direction. Beside the half mirror 6, a main photodetector 8 is provide for receiving the main light beam L reflected by the half mirror 6 to produce an information signal SO based on the light beam L received thereon. The photodetector 8 is made of a material for converting the optical energy into an electric energy such as a photoelectric element. The optical system starting from the main light source 5 to the main photodetector 8 described in the above is hereinafter referred to as a "main optical system."

The focus detection device OA1 further includes first and second auxiliary light sources 5a and 5b provided on the opposite sides of the main light source 5 for emitting first and second auxiliary light beams La and Lb, respectively. The first auxiliary light source 5a is located on the right side of the main light source 5 when viewed in FIG. 1. The first and second auxiliary light sources 5a and 5b are offset from the main light source 5 in opposite directions perpendicular to the optical axis Ap. The first and second auxiliary light sources 5a and 5b are also offset from the main light source 5 by a second predetermined distance in opposite directions parallel to the optical axis Ap, respectively. Thus, the first auxiliary light source 5a is located in a position near the condenser lens 7 by the second predetermined length when compared with the main light source 5. The second auxiliary light source 5b is located in a position far away from the condenser lens 7 by the second predetermined length when compared with the main light source 5. Adjacent the first auxiliary light source 5a on an optical path therefrom, a first exposure unit 19a having an aperture for passing the light beam La therethrough is provided. Similarly, a second exposure unit 19b is provided adjacent the second auxiliary light source 5b. By adjusting the size of this aperture, the amount of the light beam La passing through the exposure unit 19a can be controlled, so that the convergence of the auxiliary beams La and Lb on the optical disk 1 is less than that of the main light beam L, as will be described later. Additionally, by changing the shape of the aperture, the shape of light spot on the optical disk 1 can be changed.

First and second auxiliary photodetectors 8a and 8b are provided on the opposite sides of the main photo detector 8 for receiving the light beams La and Lb reflected from the recording track 3 to produce first and second focus signal SA and SB, respectively. The first photodetector 8a is located under the main photodetector 8 when viewed in FIG. 1. The optical system starting from first auxiliary light source 5a to the first photodetector 8a and from the second auxiliary light source 5b to the second photodetector 8b described above are hereinafter referred to as a "first auxiliary optical system and a "second auxiliary optical system", respectively. A focus error detection unit 10a is electrically connected with the photodetectors 8, 8a, and 8b, which will be described in details with reference with FIGS. 10a, 10b, 10c, 10d, 10e, and 10f later.

In operation, the main light beam L emitted from the main light source 5 is converged to make the spot SP0 having a first predetermined diameter on the target track 3 of the optical disk 1. The light beam L is modulated and reflected by the optical disk 1 toward the main photodetector 8, passing through the condenser lens 7 and the half mirror 6. The main photodetector 8 produces an electric signal SO based on the main light L beam received thereon.

However, as a result from the relationship between the locations of light sources 5, 5a, and 5b with respect to the condenser lens 7, the light beam La from the first auxiliary light source 5a is intercepted by the optical disk 1 before its focal point. Thus, a first auxiliary spot SPa having a second predetermined diameter greater than the first predetermined diameter is made on and around the recording track 3. The light beam Lb emitted by the second auxiliary light source 5b is focused above the optical disk 1. Then, the light beam Lb makes a second auxiliary spot SPb having a third predetermined diameter greater than the first predetermined diameter on and around the recording track 3.

It to be noted that, the second and third predetermined diameters are substantially the same when the main light beam L is in focus on the target track 3. When the main light beam L is focused above the optical disk surface 1, the second predetermined diameter of the first auxiliary spot SPa is smaller than the third predetermined diameter of the second auxiliary spot SPb. When the main light beam is focused beyond the optical disk surface 1, the second predetermined diameter is greater than the third predetermined diameter. It is possible to detect the focus error by examining the difference between those two spots SPa and SPb. Those auxiliary light beams La and Lb are modulated according to the spots area on the optical disk 1 and then reflected by the optical disk 1 to the auxiliary photodetectors 8a and 8b which produce first and second focus signals SA and SB, respectively, based on such modulated light beams La and Lb. Therefore, thus obtained focus signals SA and SB also changes according to the spot area on the optical disk 1. Then, based on these variations in diameters of the light spots, the focus error is detected by comparing those two focus signals SA and SB under the three beam focus error method. Since the three beam focus error method is well known to the personell skilled in the field of optical recording technology, the further explanation is omitted for the sake of brevity.

Figure 2:
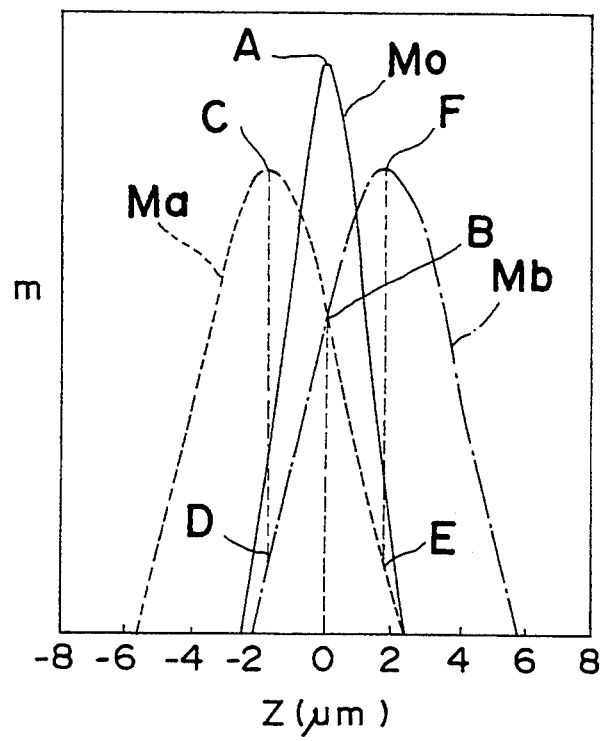
FIG. 2 is a graph showing the relationship between focus shift and the modulation factor of the playback signals by the focus detection device shown in FIG. 1.

Referring to FIG. 2, changes in the modulation factor m of the playback signals with respect to a focus shift z is shown. The focus shift z represent the distance ($\mu$m) of the focal point of the light beam L and the target track 3. Curves M0, Ma and Mb represents the modulation factor m of information signal SO produced by the main photodetector 8, and focus signals SA, and SB produced by the photodetectors 8a and 8b, respectively. When the light beam L of main optical system is focused on the optical disk 1, i.e., when z=0, the modulation factor in the information signals $0 is an extremely high value A, and the modulation factor m of focus signals SA and SB is the same low value B.

When the main optical system is focused at a point before the surface of the optical disk 1, i.e., when z<0, the modulation factor m of first focus signal SA is value C which is greater than the value D of the second focus signal SB. Conversely, when the light beam L of main optical system is focused at a point beyond the surface of the optical disk 1, i.e., when z>0, the modulation factor m of the first focus signal SA is the value E which is less than the value F of the second focus signal SB. The focus error signal can thus be obtained from the difference between the modulation factors m of first and second focus signals SA and SB, enabling it to correct the convergence of the lens 7 based on thus obtained focus error signal.

Figure 3:
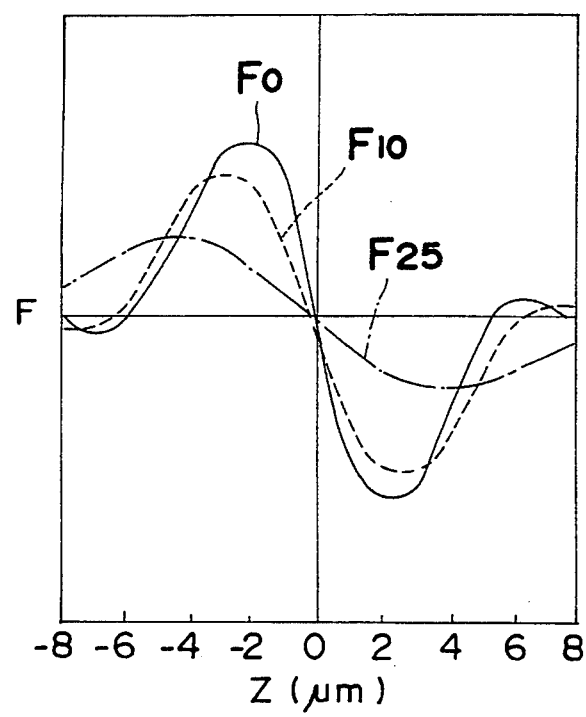
FIG. 3 is a graph showing the relationship between the focus error signal and the amount of aperture constriction applied in the auxiliary optical systems of the focus detection device shown in FIG. 1.

Referring to FIG. 3, changes in focus error signal F (the focus sine wave) with respect focus shift z with different aperture size of exposure units 19a and 19b is shown. The waves resulting from a focus signal detection device when the auxiliary beams La and Lb cross the recording tracks 3 at an angle and the focus shift z is gradually changed. Curves F0, F10, and F25 represent the focus signals when the restriction of the aperture size is 0%, 10%, and 25%, respectively. As shown in FIG. 3, the focus error detection range can be increased by thus restricting the aperture of the auxiliary beams La and Lb.

Figure 4:
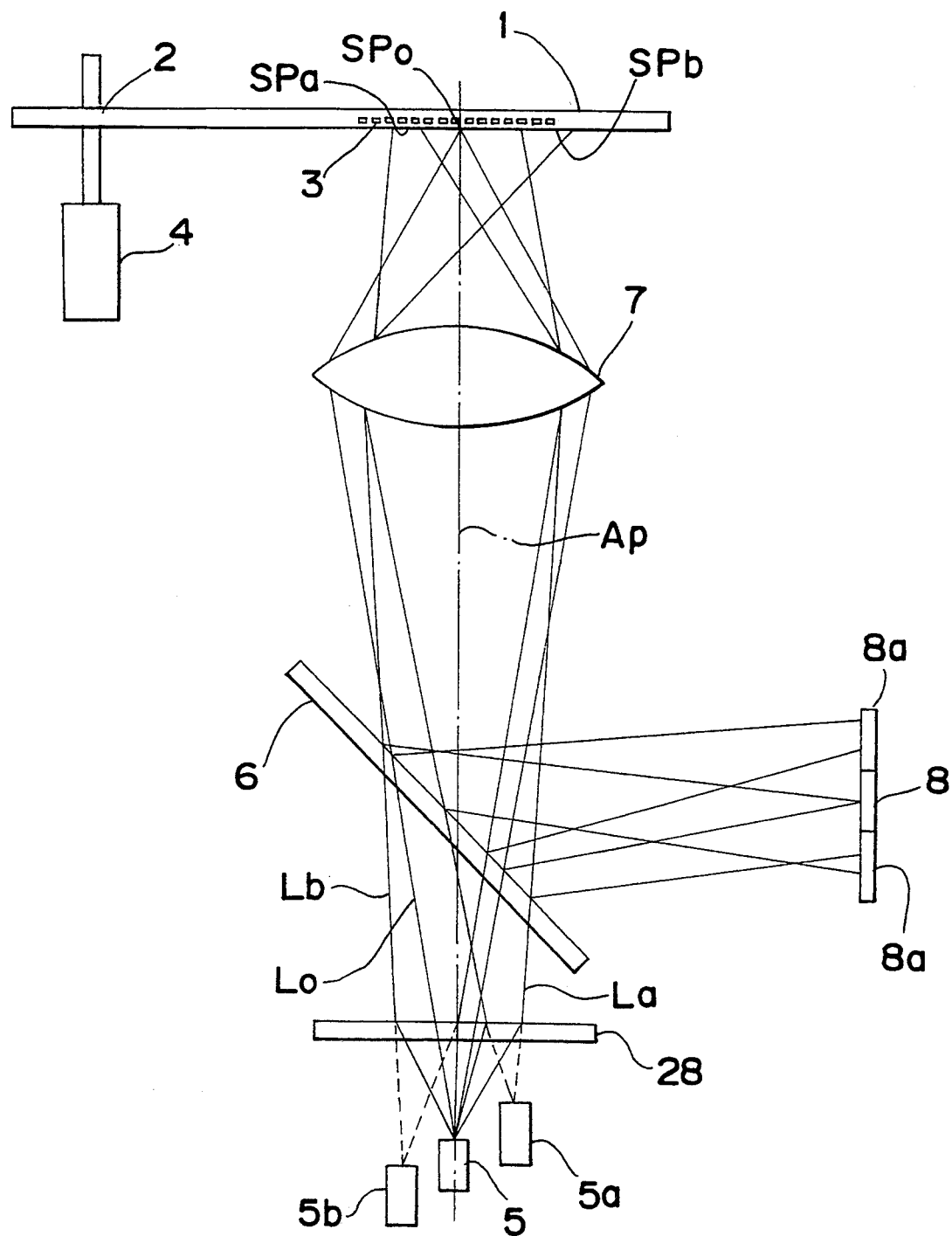
FIG. 4 is a block diagram of a focus detection device according to a second embodiment of the present invention.

Referring to FIG. 4, an optical detection device according to a second embodiment of the present invention is shown. The focus detection device OA2 has a construction similar to that of the device OA1 shown in FIG. 1. However, the auxiliary light sources 5a and 5b, and exposure units 19a and 19b are removed from the focus detection device OA2. Adjacent the main light source 5, a Fresnel zone plate 28 for splitting the light beam L into three portions having diffraction orders of +1, 0, and −1, respectively, is provided with its main plane across the optical axis Ap.

Figure 5:
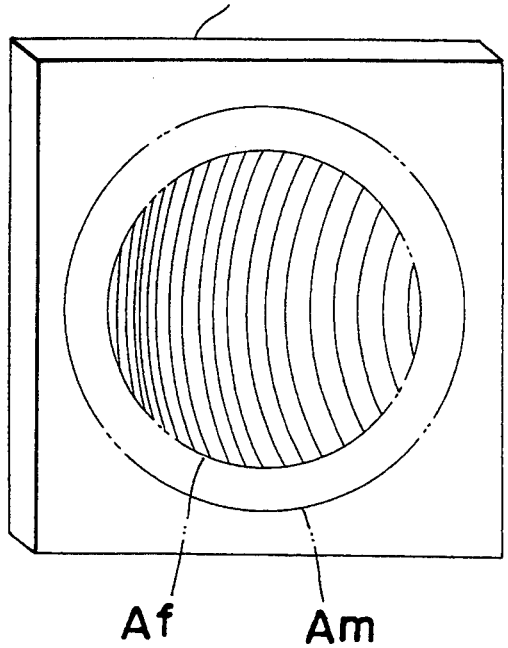
FIG. 5 is an illustration of a Fresnel zone plate used for generating the auxiliary beams in the focus detection device shown in FIG. 4.

Referring to FIG. 5, a Fresnel zone plate 28 is shown. The Fresnel zone plate 28 has an auxiliary beam production area Af formed with predetermined Fresnel pattern in a circular shape area of a center portion thereof, so that the light beam L passing therethrough is split into three portions La, L, and Lb. Around the Fresnel pattern area Af, a main beam passing area Am with no Fresnel pattern formed therein is provided for passing the light beam L therethrough. The technology to form a Fresnel pattern to achieve the above described result is well known to the personnel skilled in the optical device field.

In operation, the portion of light beam L passing through the auxiliary beam producing area Af is split in three light beams La, L, and Lb having diffraction orders of +1, 0, and −1, respectively. Together with this split light beam L, the main light beam L is impinged from the main beam passing area Am toward the optical disk 1. Thus, in this embodiment, the main light beam L and auxiliary light beams La and Lb can be obtained from a single of light source 5. By selecting the Fresnel pattern, it is possible to obtain the same effect when the auxiliary beams La and Lb are restricted by exposure units 19a and 19b. Thus, the focus error detection range can thus be expanded as in the first embodiment of the invention above.

Figure 6:
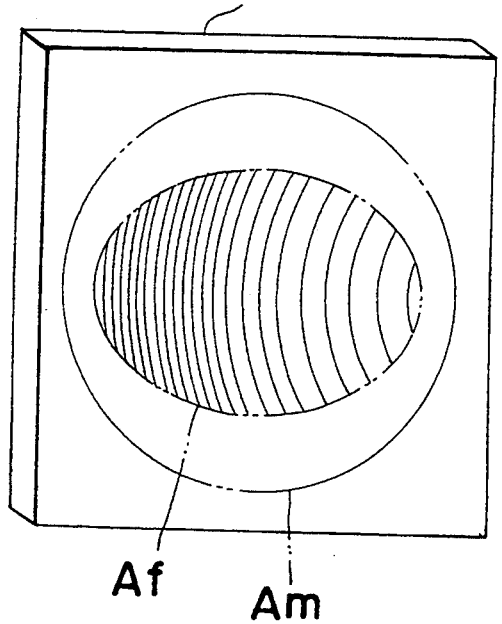
FIG. 6 is an illustration of an alternation of the Fresnel zone plate shown in FIG. 5.

Referring to FIG. 6, an alternation of the Fresnel zone plate 28 is show. In this alternation, the auxiliary beam producing area Af is formed in oval shape not in a circular shape. Thus formed Fresnel zone plate 28 is located such that fresnel patter is approximately perpendicular to an arrow direction T in which the target track extends.

Figure 7:
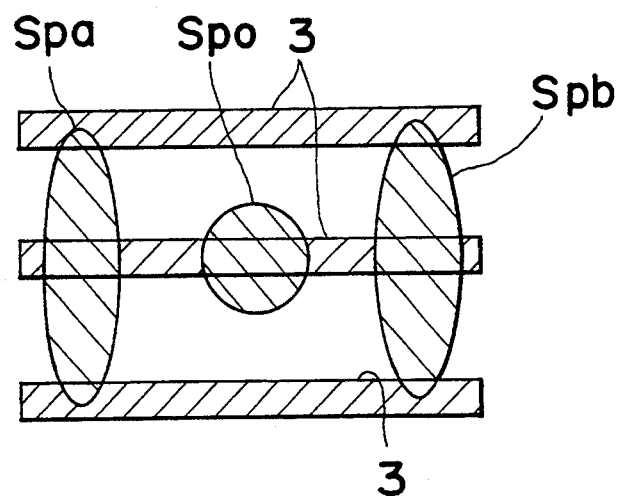
FIG. 7 is an illustration showing the positions of the main light spot and auxiliary beam spots on an optical recording medium when the Fresnel zone plate shown in FIG. 6 is used in the focus detection device shown in FIG. 4.

Referring to FIG. 7, spots SPa, SP0, and SPb made on the optical disk 1 when the fresnel zone plate 28 of FIG. 6 is used are shown. As shown, the first auxiliary spot SPa passing through the oval shaped auxiliary beam producing area Af is also in an oval shape extending in a direction perpendicular to the track 3, so that a signal of auxiliary spot SPa can cover the target track together with two neighboring tracks when the main spot SP0 is on the target track 3. Similarly, the second auxiliary spot SPb is also formed in a oval shape for covering three tracks 3. It is to be noted that the change in amplitude of the playback signal when crossing tracks can be reduced, and cross-track noise in the focus error signal can be reduced.

Figure 8:
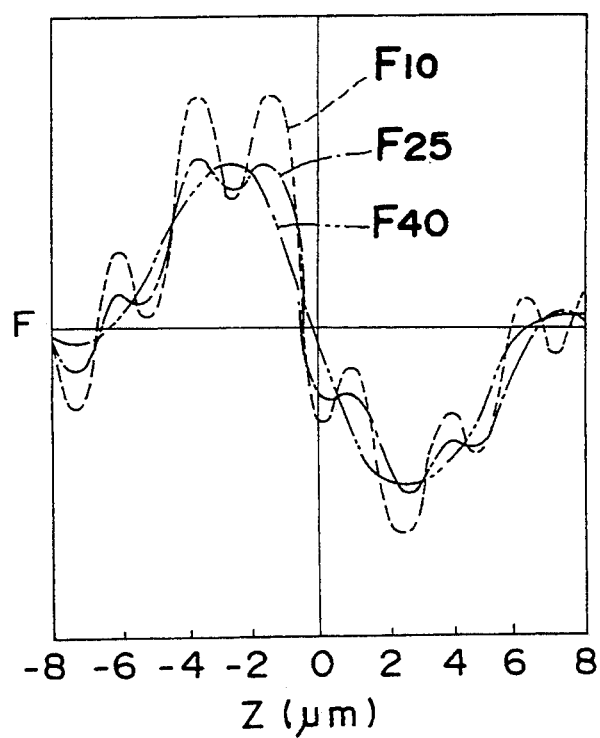
FIG. 8 is a graph showing the relationship between focus shift and the focus error signals with the various amount of aperture constriction applied in the auxiliary optical systems of the focus detection device according to the present invention.

Referring to FIG. 8, signal waves resulting from a focus detection device when the auxiliary beams cross the recording tracks 3 at an angle and the focus shift z with respect to various degrees of restriction lateral to the tracks is are shown. It is to be noted the signal wave shown in FIG. 8 is obtained from the auxiliary beams La and Lb tracking a single data track 3. Lines F0, F10, and F25 represent the focus error signals when the aperture restriction rate is 10%, 25%, and 40%, respectively. As will be known from FIG. 8, the change in the amplitude of the focus error signal during cross track movement can be reduced by lowering the convergence of the auxiliary beams in the cross track direction.

Figure 9:
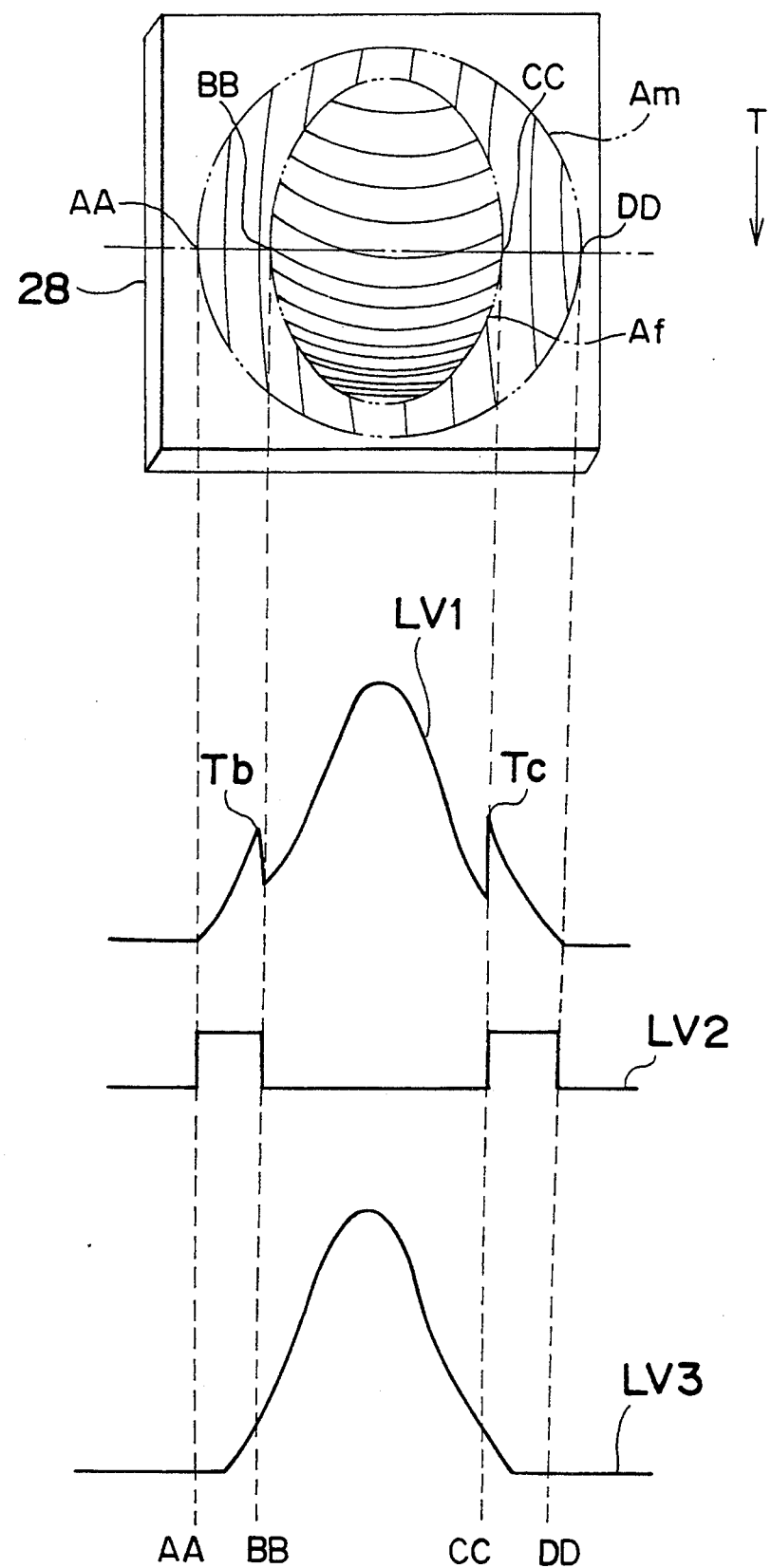
FIG. 9 is an illustration showing another alternation of the Fresnel zone plate shown in FIG. 5.

Referring to FIG. 9, another alternation of the Fresnel zone plate 28 is shown. In this alternation, a Fresnel pattern is formed in the main beam passing area Am around the auxiliary beam producing area Af. Specifically, the main beam passing area Am is formed with fresnel pattern having the same diffraction efficiency as the auxiliary beam producing area Af but a different diffraction axis. Herebelow, the light intensity distribution of main light beam L along a line perpendicular to the track direction T is described. This line crosses with the main beam producing area Am at point AA and DD and with the auxiliary beam producing area Af at point BB and CC, as shown in FIG. 9.

A first line LV1 shows the distribution of main light beam L passing through the Fresnel zone plate 28 shown in FIGS. 5 and 6 in which the main beam producing area Am has no Fresnel pattern therein. In this case, two additional peaks Tb and Tc at positions BB and CC are appeared on opposite site of the main peak, degrading the detection ability of the main spot SP0.

A second line LV2 shows a light intensity distribution of main light L passed through only the main beam producing area Am of FIGS. 5 and 6 is shown. Two constant level positions are appeared on between positions AA and BB, and CC and DD, causing the two peaks peak areas Tb and Tc of the fist line LV1 when the light beam L passes through the Fresnel zone plate 28.

A third line LV3 shows a light intensity distribution of main light L passed through the Fresnel zone plate 28 of FIG. 9. Since the Fresnel pattern in the main beam producing area Am is different from that in the area Af, the light through passing the main beam producing area Am is guided to another direction away from the optical systems of the focus detection device. Then, a smooth curve with a single peak is obtained. Thus, the convergence on the optical disk 1 of the auxiliary beams La and Lb having ±1 order can be freely adjusted without changing the shape of the convergence spot SP0 of the main light beam L having a zero-order on the medium.

As described in the above, the amplitude of the focus error signal varies with the presence of a recording track when the beams are moved across the recording tracks. The reduction of this cross-track noise by means of electrical circuitry is described below.

Figure 10:
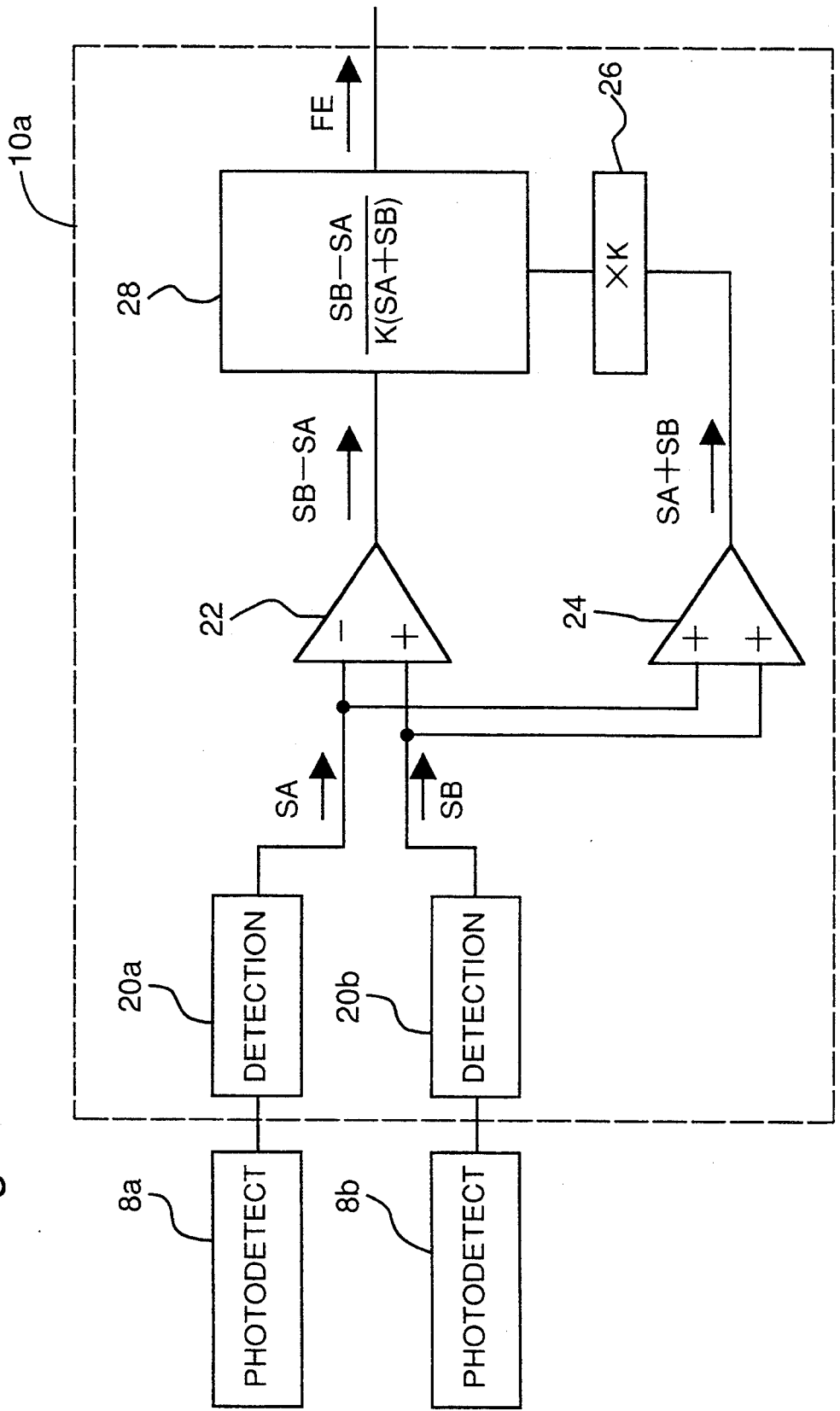
FIG. 10 is a block diagram of a focus error detection unit used in the focus detection device according to the present invention.

Referring to FIG. 10, the focus error detection unit 10a electrically connected with the photodetectors 8a and 8b is shown. The focus error detection unit 10a includes a first detector 20a connected with the first photodetector 8a for modulating the first focus signal SA to produce a first modulated signal SA. A second detector 20b connected with the second photodetector 8b for modulating the second focus signal SB to produce a second modulated focus signal SB. A subtracter 22 is connected with both the first and second detectors 20a and 20b for obtaining a difference between the first and second modulated focus signals SA and SB to produce a focus error signal. A adder 24 is also connected with both the first and second detectors 20a and 20b for producing a sum signal by adding first and second modulated focus signals SA and SB. A multiplier 26 is connected with the adder 24 for multiplying the sum signal of signals SA and SB by a predetermined value K. A divider 28 is connected with the subtracter 22 and the multiplier 26 so that a focus error detection signal FE is produced by dividing the focus error signal by the sum signal, which can be expressed as:

$$FE = (SA - SB)/K \times (SA + SB) \quad (1).$$

This is because that the modulation factor (the amplitude) of the signals SA and SB produced from the auxiliary optical systems change according to the presence of a recording track when the beams La and Lb cross the recording tracks 3. As a result, the amplitude of the focus error signal which is the difference signal, SB−SA, obtained from two auxiliary light beams La and Lb also changes. Therefore, by modulating the sum signal of the modulated focus signals SA and SB from the auxiliary photodetectors 8a and 8b, which are similarly modulated by the presence of a recording track 3, i.e., by dividing the focus error signal by the sum signal, the change in the amplitude of the focus error signal can be reduced when crossing the recording tracks 3.

Figure 11:
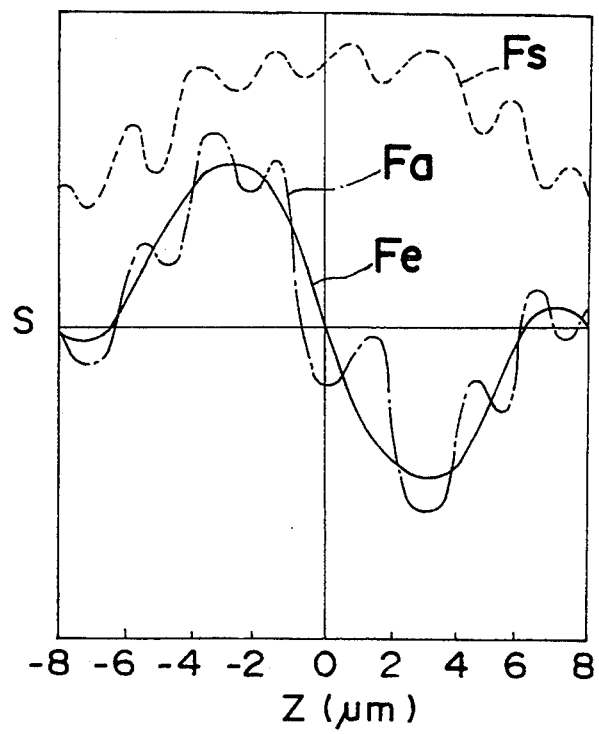
FIG. 11 is a graph showing the signals observed in the focus error detection unit shown in FIG. 10.

Referring to FIG. 11, the signals observed in the focus error detection unit 10a of FIG. 10 is shown. A first line Fa shows the difference signal, a focus error signal before division by the divider 28 of FIG. 10, during cross-track movement of the auxiliary light beams La and Lb. A second line Fs shows the sum signal produced by the adder 24. A third line Fe shows the focus error detection signal produced by the divider 28. As will be known from this figure, the change in the amplitude of the focus error detection signal FE during cross-track movement of the auxiliary beams La and Lb can be reduced using the focus error signal processing unit 10a of FIG. 10.

Figure 12:
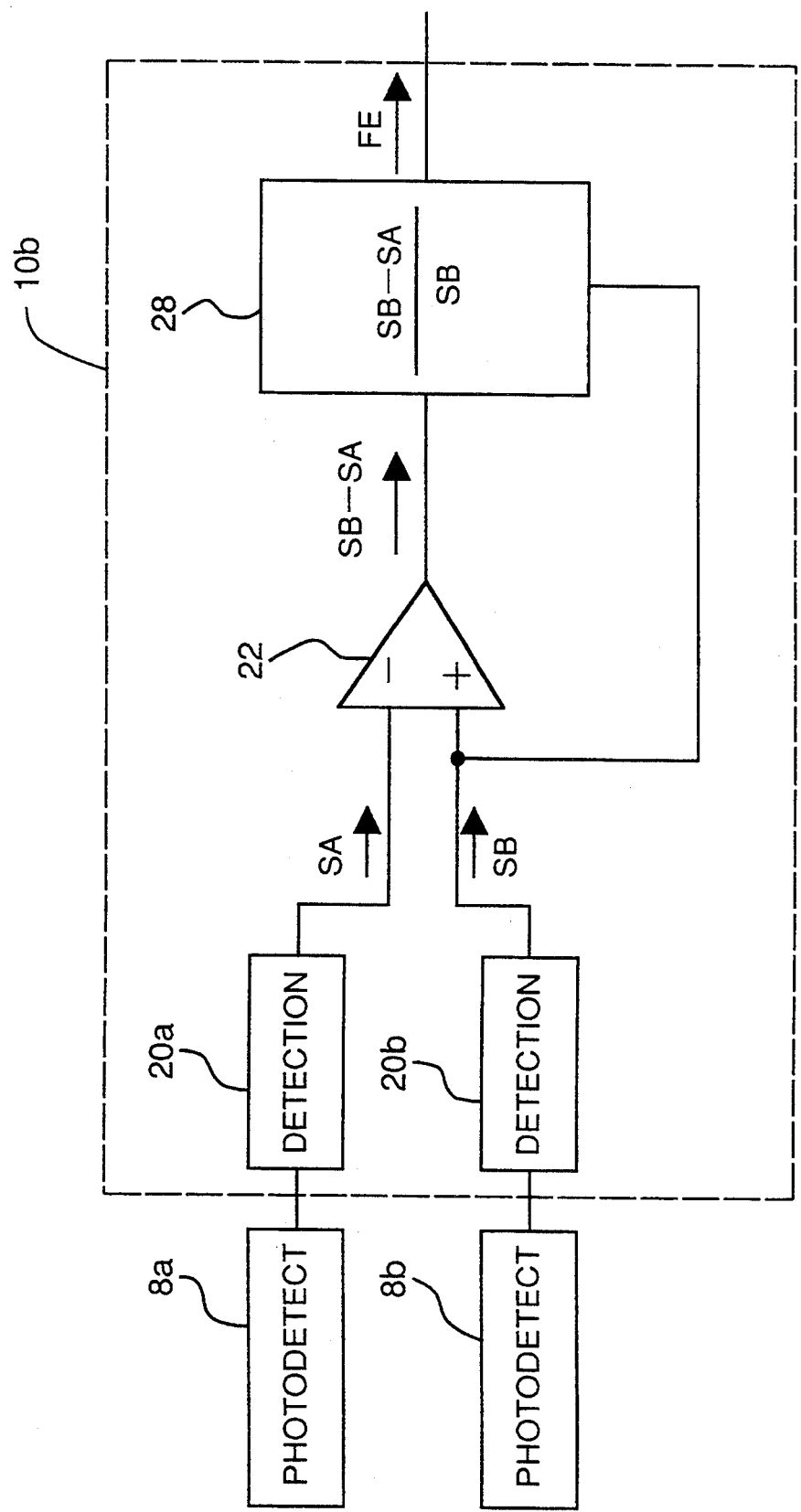
FIG. 12 is a block diagram of an alternation of focus error detection unit shown in FIG. 10.

Referring to FIG. 12, an alternation of the focus error detection unit 10a shown in FIG. 10 is shown. In this alternation, the focus error detection unit 10b has a construction similar to that of FIG. 10, but the adder 24 and multiplier 26 are removed therefrom in FIG. 12. Then, the focus error detection signal FE is produced by dividing the focus error signal by the second modulated signal SB, which can be expressed as:

$$FE = (SA - SB)/SB \tag{2}$$

By modulating the focus error signal by the amplitude of the second modulated signal SB, the change in the amplitude of the focus error signal can be reduced when crossing the recording tracks.

Figure 13:
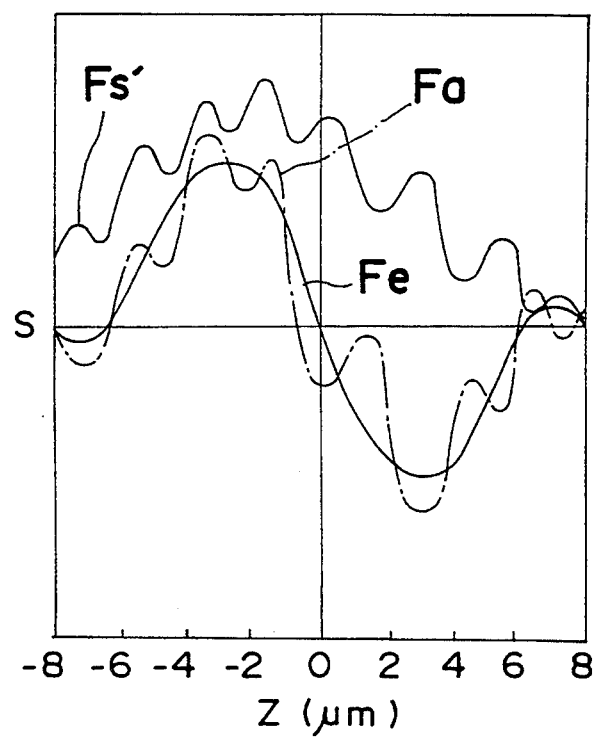
FIG. 13 is a graph showing the signals observed in the focus error detection unit shown in FIG. 12.

Referring to FIG. 13, the signals observed in the focus error detection unit 10b of FIG. 12 is shown. A line Fs' shows the second modulated signal SB from the second photodetector 8b. Other lines line Fa and Fe are the same as those described with reference to FIG. 10. As will be known from this figure, the change in the amplitude of the focus error detection signal FE during cross-track movement of the beams can be reduced using the focus error detection unit 10b of FIG. 12.

Figure 14:
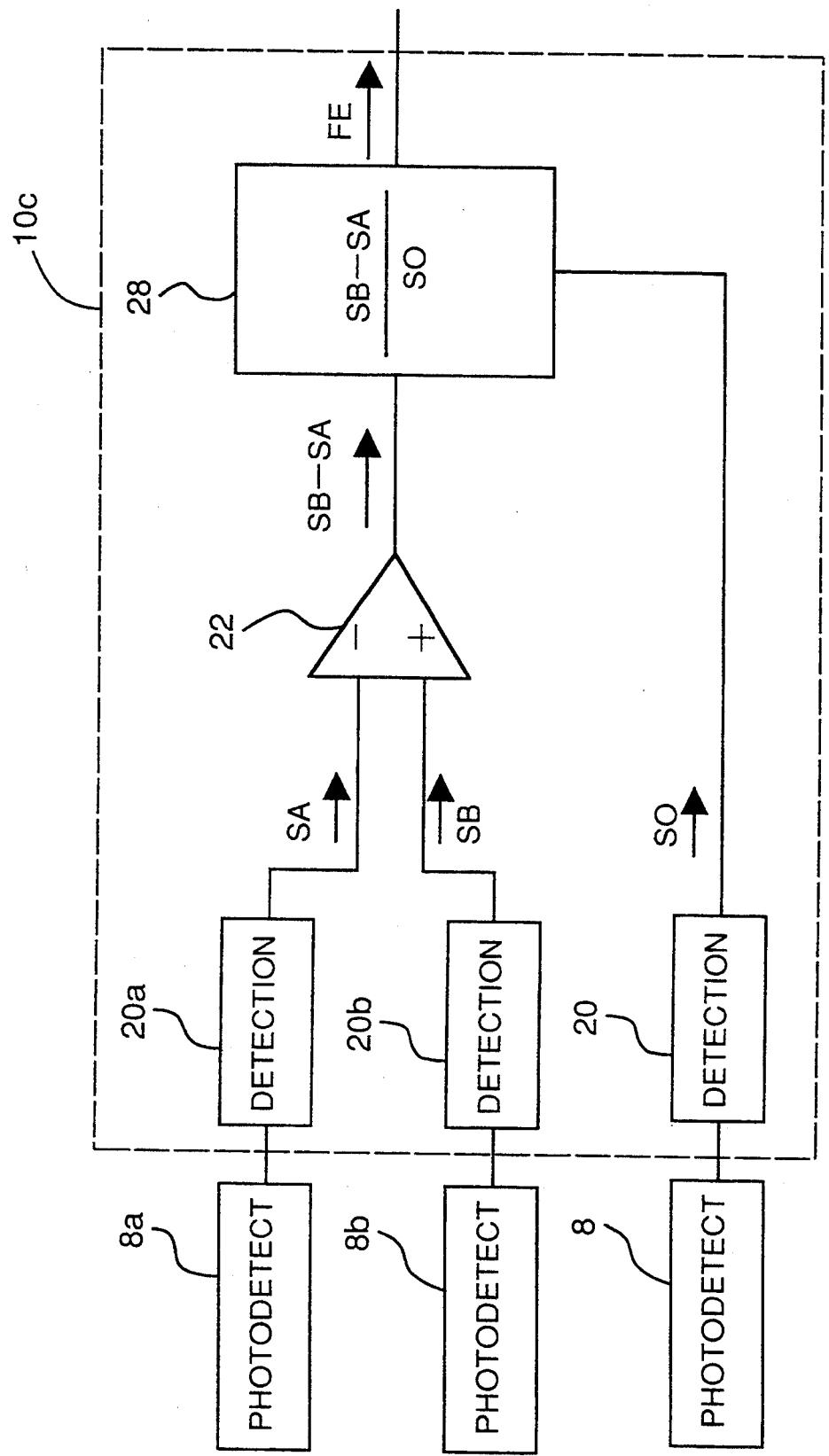
FIG. 14 is a block diagram of another alternation of focus error detection unit shown in FIG. 10.

Referring to FIG. 14, another alternation of the focus error detection unit 10a shown in FIG. 10 is shown. In this alternation, the focus error detection unit 10c has a construction similar to that of unit 10b shown in FIG. 12. But a third detector 20 connected with the first photodetector 8 for modulating the information signal SO is added and is connected with the divider 28 instead of the second detector 20b. Then, the focus error detection signal FE is produced by dividing the focus error signal by the modulated information signal S0, which can be expressed as:

$$FE = (SA - SB)/SO \tag{3}$$

By modulating this focus error signal by the amplitude of the modulation factor signal of the playback signal SO from the main photodetector 8, the change in the amplitude of the focus error signal can be reduced when crossing the recording tracks.

Figure 15:
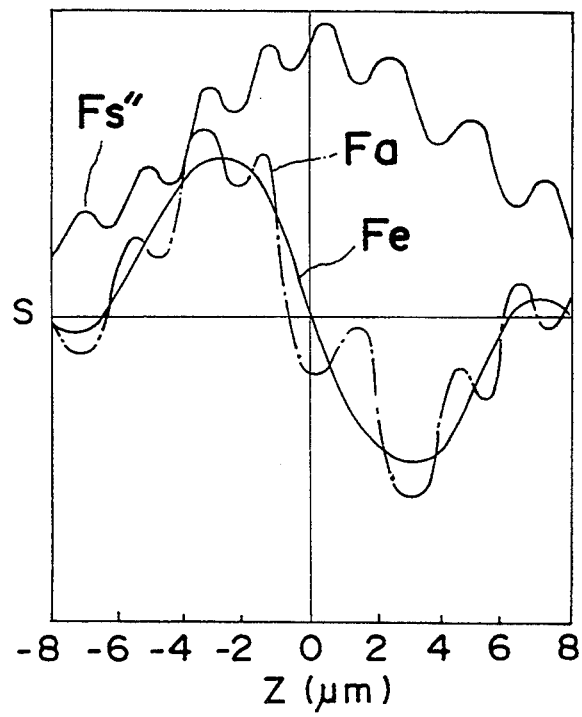
FIG. 15 is a graph showing the signals observed in the focus error detection unit shown in FIG. 14.

Referring to FIG. 15, the signals observed in the focus error detection unit 10c of FIG. 13 is shown. A line Fs" shows the modulated information signal SO from the main photodetector 8. Other lines line Fa and Fe are the same as those described with reference to FIG. 10. As will be known from this figure, the change in the amplitude of the focus error detection signal FE during cross-track movement of the beams can be reduced using the focus detection unit 10c.

Figure 16:
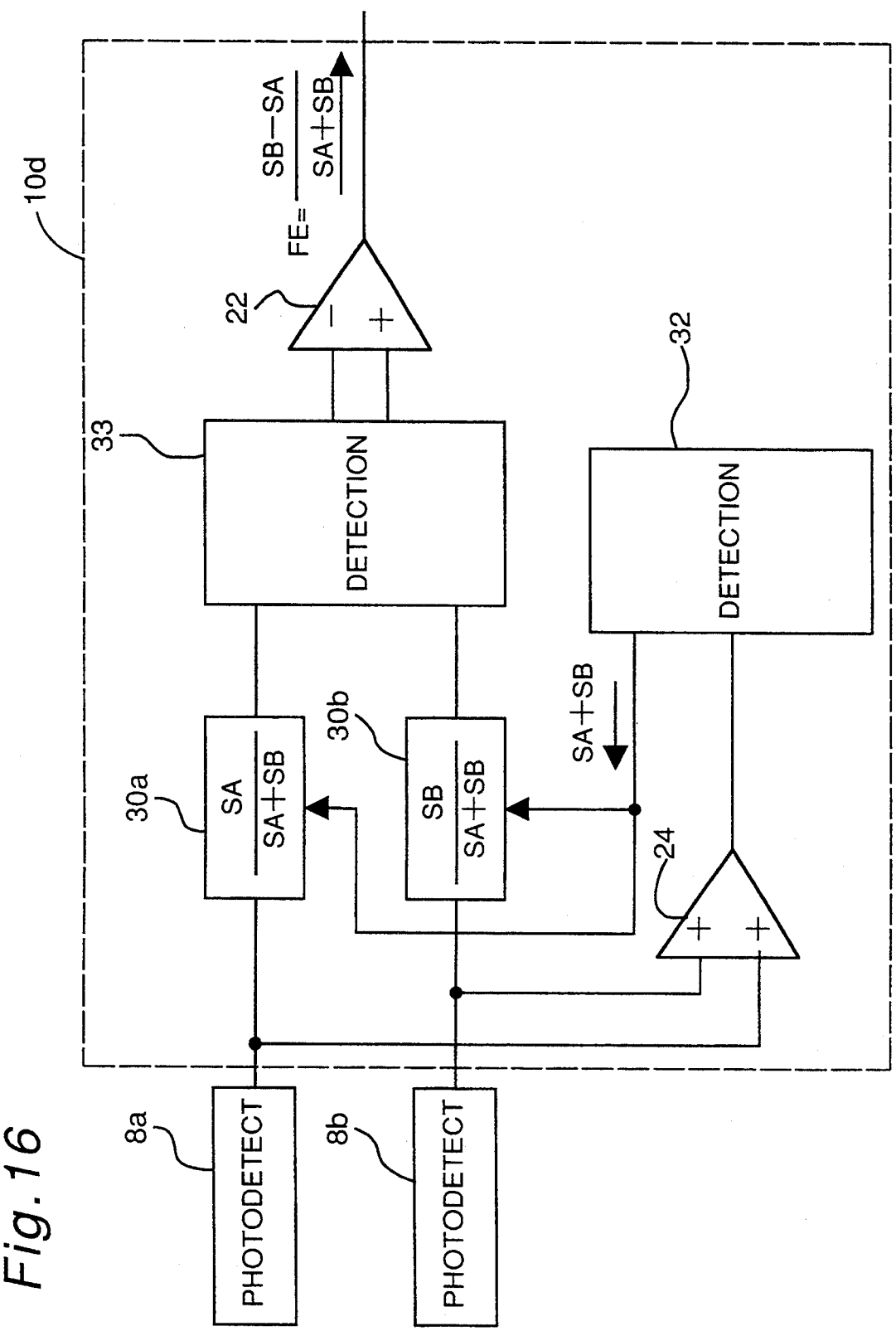
FIG. 16 is a block diagram of further alternation of the focus error detection unit shown in FIG. 10.

Referring to FIG. 16, further alternation of the focus error detection unit 10a shown in FIG. 10 is shown. In this alternation, the focus error detection unit 10d has first and second dividers 30a and 30b connected with first and second photodetectors 8a and 8b, respectively. An adder 31 is connected with first and second photodetectors 8a and 8b for producing a sum signal by adding the focus signal SA and SB. A first detector 32 having an input terminal connected with the adder 31 for receiving and modulating the sum signal, and two output terminals connected with first and second dividers 30a and 30b for outputting the modulated sum signal. The first divider 30a divides the first focus signal SA by the demodulated sum signal to produce the first focus signal SA with its gain changed, which can be expressed as:

$$SA = SA/(SA+SB) \tag{4}$$

Similarly, the second divider 30b produces the gain changed second focus signal SB, which can be expressed as:

$$SB = SB/(SA+SB) \tag{5}$$

A second detector is connected to first and second dividers 30a and 30b for modulating the gain changed focus signals SA and SB. The subtracter 22 is connected with the second divider 33 for obtaining the focus error detection signal FE by subtracting the modulated gain changed first focus signal SA from the modulated gain changed second focus signal SB, which can be expressed as:

$$\begin{aligned} FE &= SB/(SA + SB) - SA/(SA + SB) \\ &= (SB - SA)/(SA + SB). \end{aligned} \tag{6}$$

Thus, in this alternation a processing loop is added to obtain the sum signal of the focus signals SA and SB and then obtain the modulation factor of this sum signal. The gain of the focus signals SA and SB is then changed using the modulation factor of the sum signal, and the modulation factor of the gain changed focus signals SA and SB are compared to obtain the focus error detection signal FE.

Figure 17:
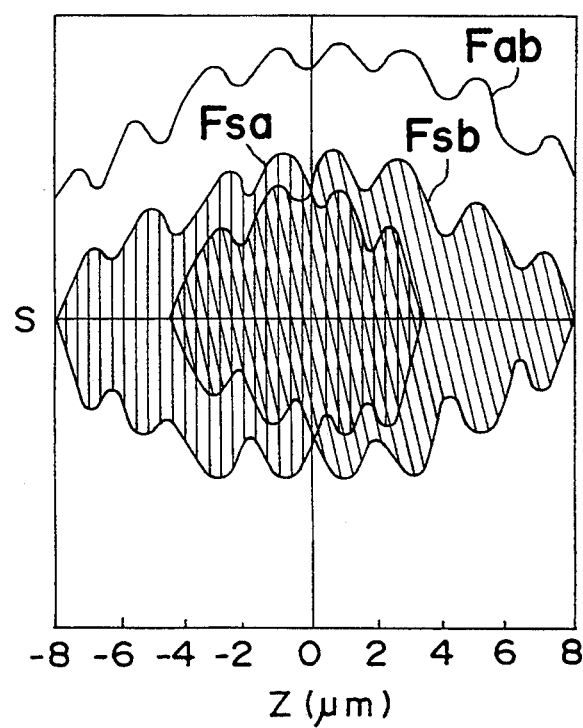
FIG. 17 is a graph showing the modulation factor signals of the playback signals from the focus detection device shown in FIG. 16.

Referring to FIG. 17, signals observed in the focus error detection unit 10d are shown. Area Fsa and Fsb represent the focus signals SA and SB produced from the first and second photodetectors 8a and 8b, respectively, during cross-track movement. A line Fab represent the modulated sum signal of focus signal SA and SB.

Figure 22:
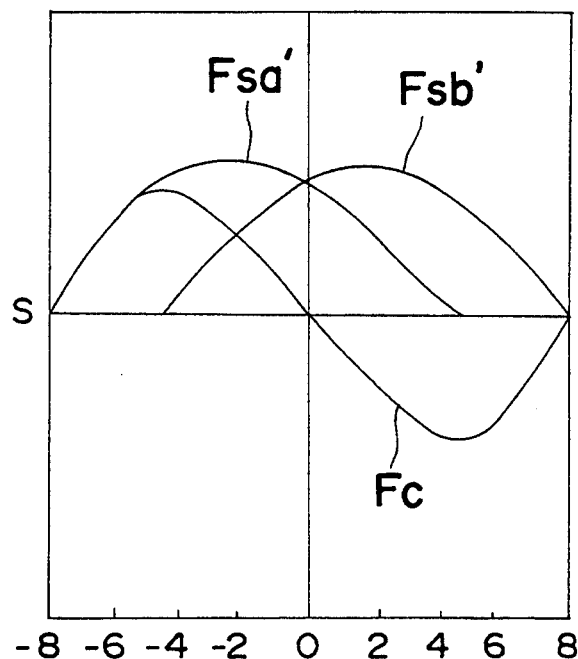
FIG. 22 is a graph showing the focus error signal and the modulation factor signals of the playback signals from the auxiliary optical systems after the internal operation of the focus error detection units shown in FIGS. 16, 18, and 20.
Figure 24:
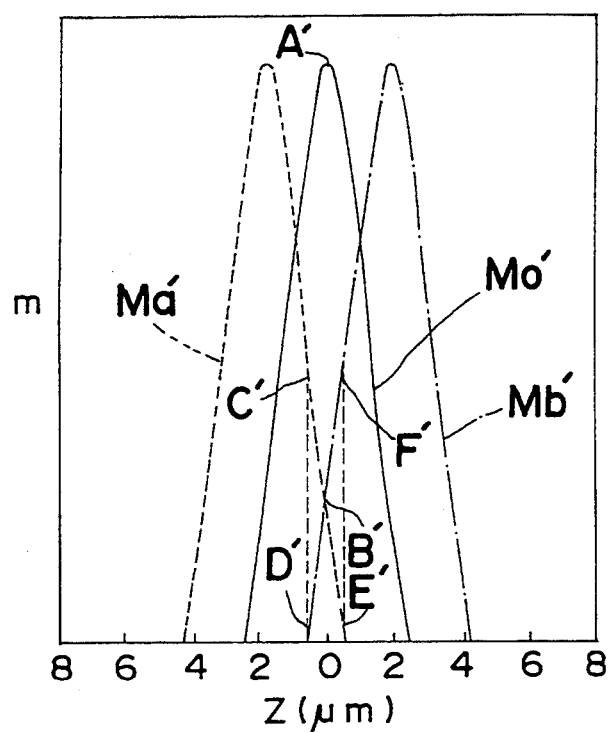
FIG. 24 is a graph showing the relationship between focus shift and the modulation factor of the playback signals by the conventional focus detection device shown in FIG. 23.
Figure 23:
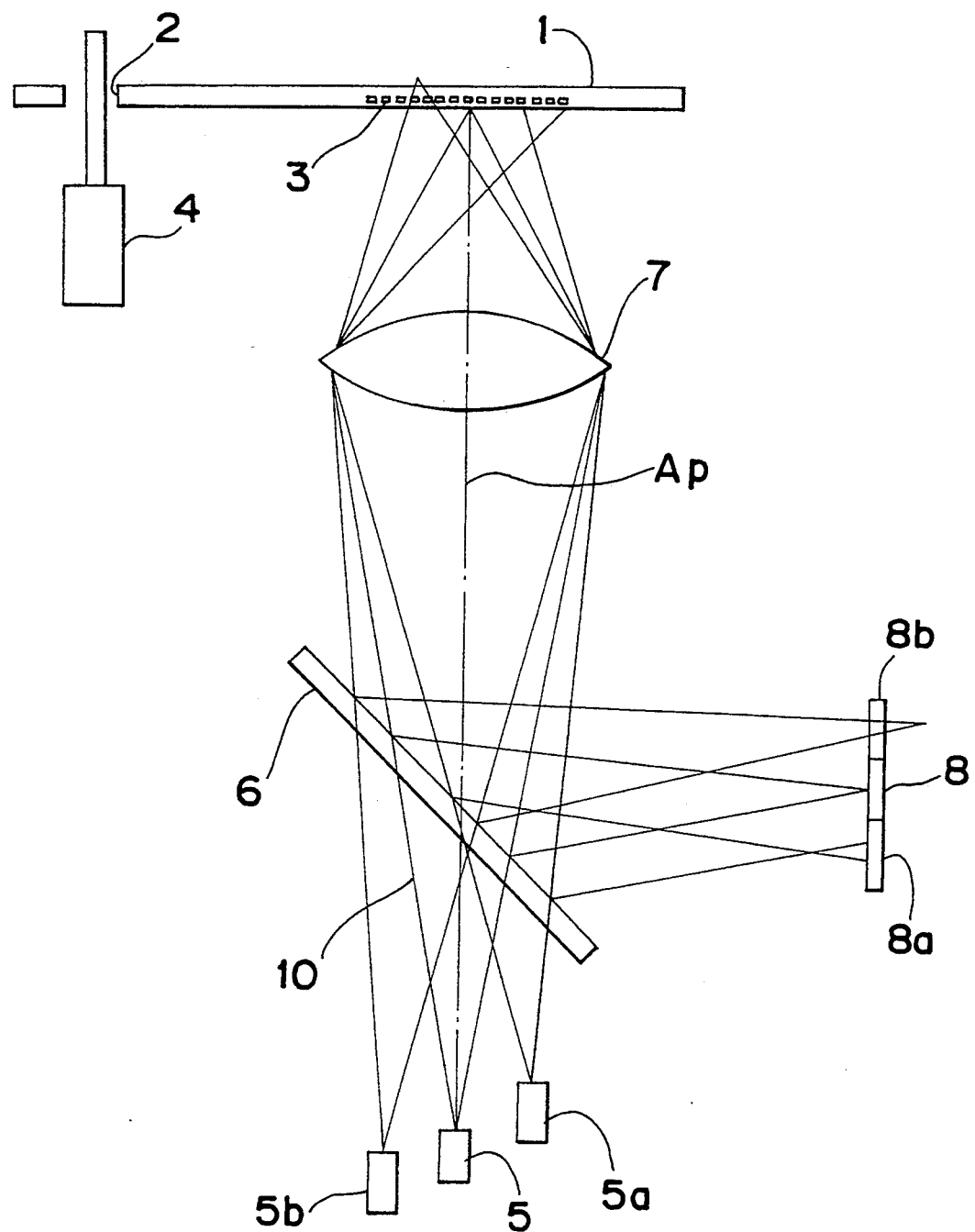
FIG. 23 is a block diagram showing a conventional focus detection device.

Referring to FIG. 22, Lines Fsa' and Fsb' represent the modulated gain changed focus signals SA and SB produced by the second detector 33. The line FE represents the focus error detection signal which is the difference signal obtained from the modulated gain changed signals SA and SB produced by the subtracter 22. As will be known from these figures, the change in the amplitude of the focus error signal during cross-track movement of the beams can be reduced using the focus error detection unit 10d.

Figure 18:
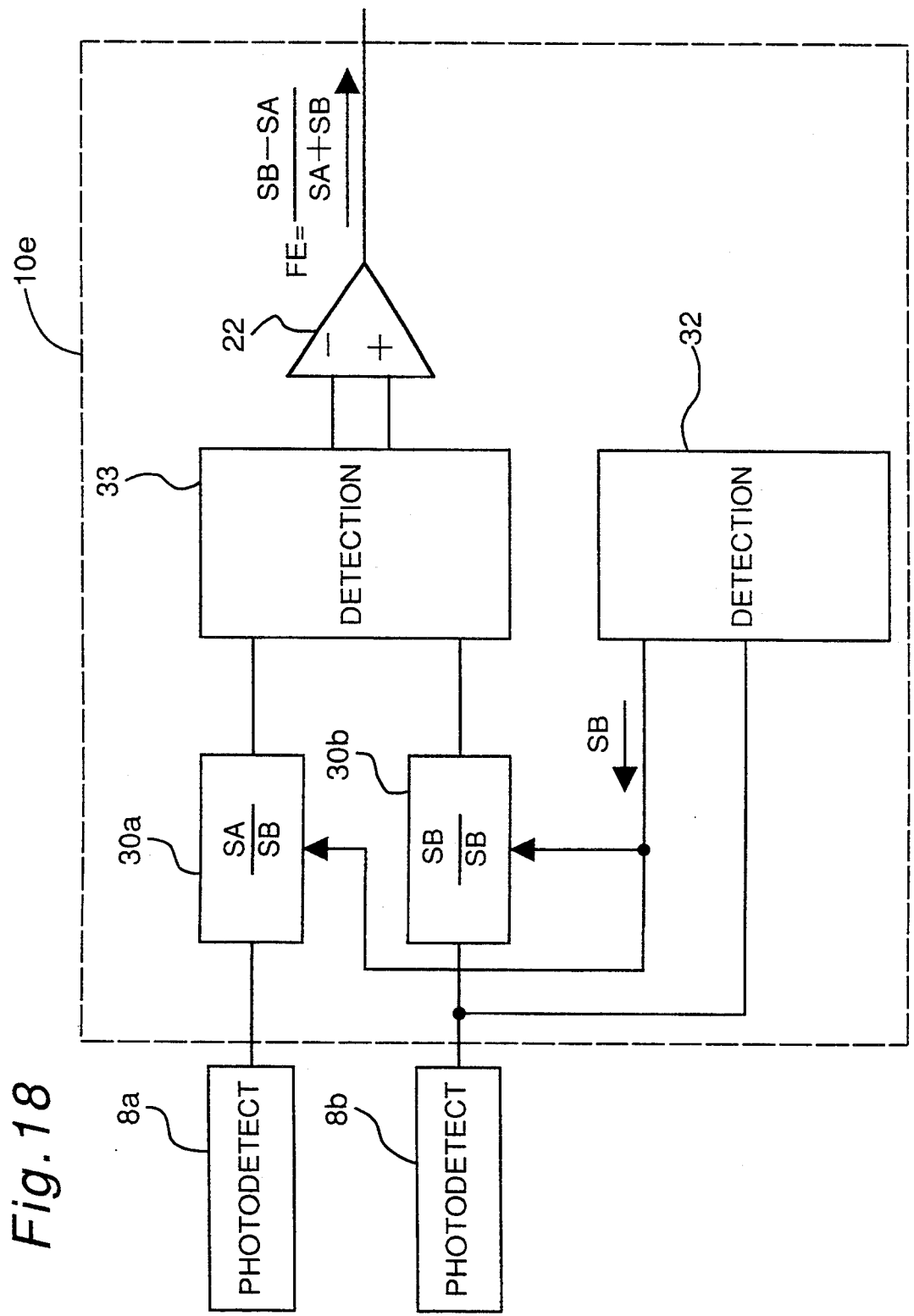
FIG. 18 is a block diagram of still further alternation of the focus error detection unit shown FIG. 10.

Referring to FIG. 18, a still further alternation of the focus error detection unit 10a shown in FIG. 10 is shown. In this alternation, the focus error detection unit 10e has a construction similar to that of the focus error detection unit 10d of FIG. 16. When compared with FIG. 16, the adder 31 is removed therefrom and the input terminal of the first detector 32 is connected with the second photodetector 8b only. Then, The first divider 30a divides the first focus signal SA by the modulated second focus signal SB to produce the first focus signal SA with its gain changed, which can be expressed as:

$$SA = SA/SB \qquad (7)$$

Similarly, the second divider 30b produces the gain changed second focus signal SB, which can be expressed as:

$$SB = SB/SB \qquad (8)$$

The subtracter 22 produces the focus error detection signal FE by subtracting the modulated gain changed first focus signal SA from the modulated gain changed second focus signal SB, which can be expressed as:

$$FE = SB/SB - SA/SB = (SB - SA)/SB \qquad (9)$$

Thus, the focus error detection signal FE is obtained by adding a processing loop to modify the gain of the focus signals SA and SB using the modulation factor of the focus signal SB, and the degrees of modulation of the processed signals SA and SB are then compared to obtain the focus error detection signal FE.

Figure 19:
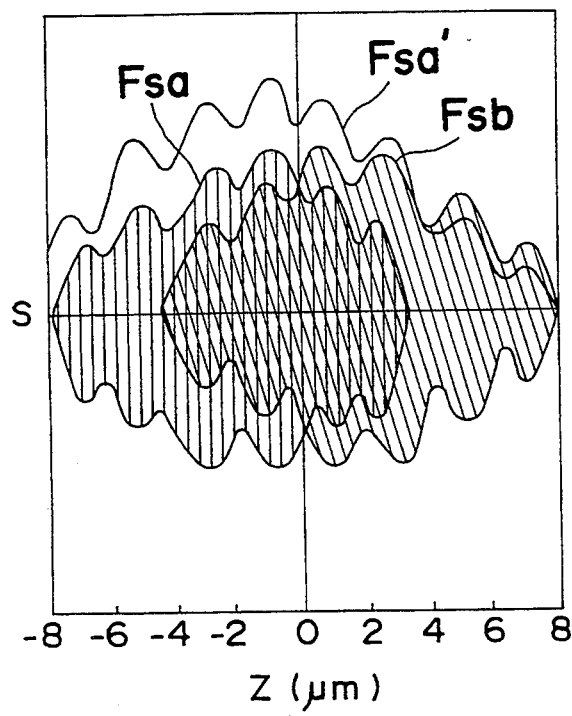
FIG. 19 is a graph showing the signals observed in the focus error detection unit shown in FIG. 18.

Referring to FIGS. 19 and 22, signals observed in the focus error detection unit 10e are show. As will be known from these figures, the change in the amplitude of the focus error signal during cross-track movement of the auxiliary beams La and Lb can be reduced using the focus error detection unit 10e.

Figure 20:
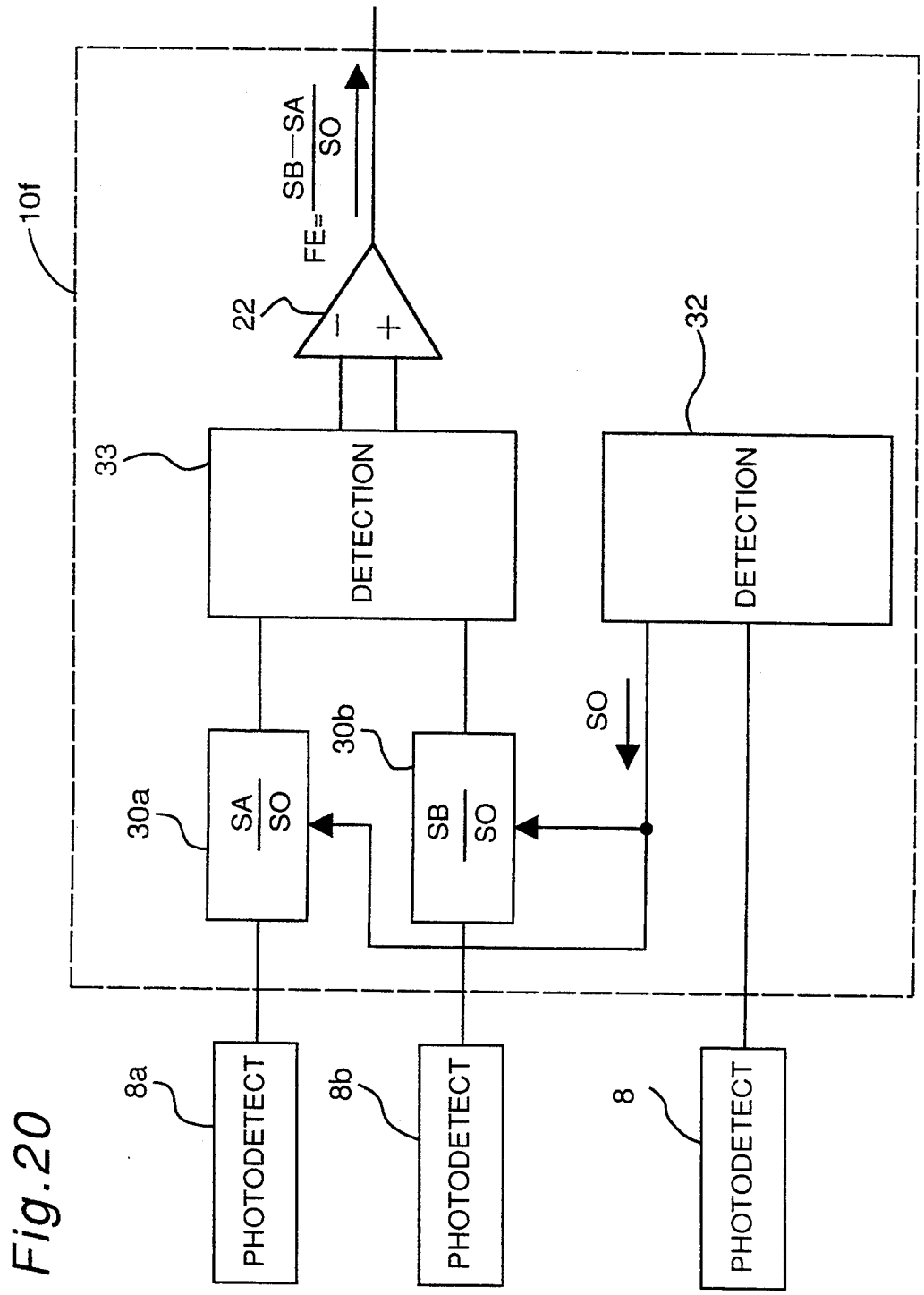
FIG. 20 is furthermore another alternation of the focus error detection unit shown in FIG. 10.

Referring to FIG. 20, furthermore another alternation of the focus error detection unit 10a is shown. In this alternation, the focus error detection unit 10f has a construction similar to that of the focus error detection unit 10e of FIG. 18. When compared with FIG. 18, the input terminal of the first detector 32 is connected with the main photodetector 8 instead of the second photodetector 8b. Then, The first and second divider 30a and 30b produce first and second focus signal SA and SB with their gain changed, which can be expressed as:

$$SA = SA/SA \qquad (7')$$

$$SB = SB/SA \qquad (8')$$

The subtracter 22 produces the focus error detection signal FE, which can be expressed as:

$$FE = SB/SA - SA/SA = (SB - SA)/SA \qquad (9')$$

Thus, the focus error detection signal FE is obtained by adding a processing loop to modify the gain of the focus signals SA and SB using the modulation factor of the focus signal SA, and the degrees of modulation of the processed signals SA and SB are then compared to obtain the focus error detection signal FE.

Figure 21:
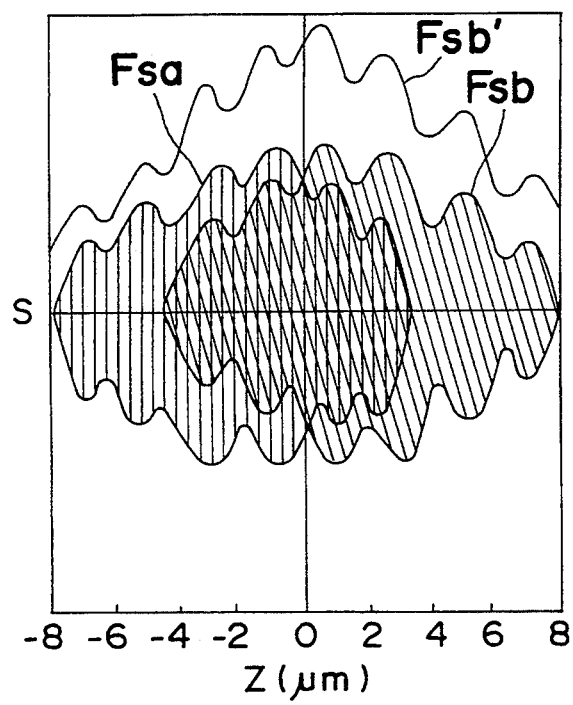
FIG. 21 is a graph showing signals observed in the focus error detection unit shown in FIG. 20.

Referring to FIGS. 21 and 22, signals observed in the focus error detection unit 10f are shown. As will be known from these figures, the change in the amplitude of the focus error signal during cross-track movement of the auxiliary beams La and Lb can be reduced using the focus error detection unit 10e.

As described hereinabove, the focus error detection range can be freely adjusted by adjusting the aperture through which the auxiliary beams are emitted. The cross-track noise of the focus error signal can also be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A focus detection device for reading and writing an information on and from an optical recording medium having a recording track formed thereon, said device comprising:

a first light emission means for emitting a first light beams in a first direction toward said optical disk;

a converging means provided between said optical recording medium and said first emission means for converging said first beam to make a first spot focused on said recording track;

a second light emission means provided on a first side of said first light emission means for emitting a second light beam such that said emitted second light beam is focused by said converging means beyond said optical recording medium to make a second spot having a first predetermined diameter around said recording track;

a first light restriction means provided in a path of said second emitted light beam adjacent said second light emission means for restricting the amount of said second emitted light beam passing there through;

a third light emission means provided on a second side of said first light emission means for emitting a third light beam such that said emitted third light beam is focused by said converging means above said optical recording medium to make a third spot having a second predetermined diameter around said recording track, said first and second sides being opposite to each other, said second predetermined diameter being vertically same as said first predetermined diameter when said first spot being in focus on said recording track, said second and third spots being located on opposite sides of said first spot;

a second light restriction means provided in a path of said third emitted light beam adjacent said third light emission means for restricting the amount of said second emitted light beam passing there through;

a beam guide means for guiding said first, second and third light beams reflected from said optical recording medium in a second direction;

a first photodetection means inserted in a path of said guided first light beam for receiving said guided first light beam to produce an information signal representing information recorded on said recording track;

a second photodetection means inserted in a path of said guided second light beam for receiving said guided second light beam and producing a first focus signal; and a third photodetection means inserted in a path of said guided third light beam for receiving said guided third light beam and producing a second focus signal.

2. A focus detection device as claimed in claim 1, wherein said first and second light restriction means are formed with apertures means therein, respectively, so that said first and second emitted light beams can pass through said apertures, means.

3. A focus detection device as claimed in claim 1, wherein said aperture means is formed in a shape defined by a first dimension in a direction parallel to said recording track and a second dimension in a direction perpendicular to said recording track, said first dimension is smaller than said second dimension.

4. A focus detection device for reading an information from an optical recording medium having a recording track formed thereon, said device comprising:
   a first light emission means for emitting a first light beams in a first direction toward said optical disk;
   a Fresnel zone plate means located in a path of said emitted first light beam for splitting said emitted first light beam into said first light beam, a second light beam, and a third light beam, said second and third light beams acting as emitted from light sources located on opposite sides of said first light emission means aligned with said first direction, said Fresnel zone plate means comprising a first area and a second area in a round shape formed inside said first area, said first area being formed with no Fresnel pattern having a first diffraction axis formed therein for passing said first emitted light beam and a second area with Fresnel pattern formed therein for splitting said emitted first light into said first, second, and third light beam;
   a converging means provided between said optical recording medium and said first emission means for conversing said first beam to make a first spot focused on said recording track, said second light beam being focused beyond said optical recording medium to make a second spot having a second predetermined size around said recording track, said third light beam being focused above said optical recording medium to make a third spot having a second predetermined size around said recording track, said first and second sides are opposed to each other, said second and third spots are located on opposite sides of said first spot;
   a beam guide means for guiding said first, second, and third light beams reflected from said optical recording medium in a second direction;
   a first photodetection means inserted in a path of said guided first light beam for receiving said guided first light beam to produce an information signal representing information recorded on said recording track;
   a second photodetection means inserted in a path of said guided second light beam for receiving said guided second light beam and producing a first focus signal; and
   third photodetection means inserted in a path of said guided third light beam for receiving said guided third light beam and producing a second focus signal.

5. A focus detection device as claimed in claim 4, wherein said second area is formed in an oval shape which major axis is parallel to said recording track.

6. A focus detection device as claimed in claim 5, wherein said first area is formed with a Fresnel pattern having a second diffraction axis.

7. A focus detection device as claimed in claim 1, further comprising a focus error signal processing means for producing a focus error signal based on said first and second focus signals, said focus error signal processing means comprising:
   a first modulation means connected with said first photodetector means for modulating said first focus signal;
   a second modulation means connected with said second photodetector for modulating said second focus signal;
   a subtraction means connected with both of said first and second detector means for producing a focus error signal by subtracting said modulated first focus signal from said modulated second focus signal;
   a adder means connected with both of said first and second detector means for producing a sum signal by adding said modulated first focus signal and said modulated second focus signal;
   a multiplier means connected with said adder means for producing a multiplied sum signal by multiplying said sum signal by a predetermined value; and
   a divider means connected with said subtracter means and said multiplier means for producing said focus error detection signal by dividing said sum signal by said multiplied signal.

8. A focus detection device as claimed in claim 1, further comprising a focus error signal processing means for producing a focus error signal based on said first and second focus signals, said focus error signal processing means comprising:
   a first modulation means connected with said first photodetector means for modulating said first focus signal;
   a second modulation means connected with said second photodetector for modulating said second focus signal;
   a subtraction means connected with both of said first and second detector means for producing a focus error signal by subtracting said modulated first focus signal from said modulated second focus signal; and
   a divider means connected with said subtracter means and said second detector means for producing said focus error detection signal by dividing said focus error signal by said multiplied second focus signal.

9. A focus detection device as claimed in claim 1, further comprising a focus error signal processing means for producing a focus error signal based on said first and second focus signals, said focus error signal processing means comprising:
   a first modulation means connected with said first photodetector means for modulating said first focus signal;
   a second modulation means connected with said second photodetector for modulating said second focus signal;
   a third modulation means connected with said main photodetector for modulating said information signal;
   a subtraction means connected with said first and second detector means for producing a focus error signal by subtracting said modulated first focus signal from said modulated second focus signal; and a divider means connected with said subtracter means and said third detector means for producing said focus error detection signal by dividing said focus error signal by said modulated information signal.

10. A focus detection device as claimed in claim 1, further comprising a focus error signal processing means for producing a focus error signal based on said first and second focus signals, said focus error signal processing means comprising:
   a first modulation means connected with said first photodetector means for modulating said first focus signal;
   a second modulation means connected with said second photodetector for modulating said second focus signal;
   a first adder connected with said first and second photodetectors for producing a sum signal by adding said first focus signal and said second focus signal;
   a first detector means connected with said first adder for modulating said sum signal;
   a first divider means connected with said first photodetector and said first detector means for producing a gain changed first focus signal by dividing said first focus signal by said modulated sum signal;
   a second divider means connected with said second photodetector and said first detector means for producing a gain changed second focus signal by dividing said second focus signal by said modulated sum signal;
   a second detector means connected with said first and second divider means for modulating said gain changed first focus signal and said gain changed second focus signal; and
   a subtraction means connected with said second detector means for producing a focus error signal by subtracting said modulated gain changed first focus signal from said gain modulated gain changed second focus signal.

11. A focus detection device as claimed in claim 1, further comprising a focus error signal processing means for producing a focus error signal based on said first and second focus signals, said focus error signal processing means comprising:
   a first modulation means connected with said first photodetector means for modulating said first focus signal;
   a second modulation means connected with said second photodetector for modulating said second focus signal;
   a first detector means connected with said second photodetector for modulating said second focus signal;
   a first divider means connected with said first photodetector and said first detector means for producing a gain changed first focus signal by dividing said first focus signal by said modulated second focus signal;
   a second divider means connected with said second photodetector and said first detector means for producing a gain changed second focus signal by dividing said second focus signal by said modulated second focus signal;
   a second detector means connected with said first and second divider means for modulating said gain changed first focus signal and said gain changed second focus signal; and
   a subtraction means connected with said second detector means for producing a focus error signal by subtracting said modulated gain changed first focus signal from said gain modulated gain changed second focus signal.

12. A focus detection device for reading and writing information on and from an optical recording medium having a recording track formed thereon, said device comprising:
   first light emission means for emitting a first light beam in a first direction toward said optical disk;
   converging means provided between said optical recording medium and said first emission means for converging said first beam to make a first spot focused on said recording track;
   second light emission means for emitting a second light beam such that said emitted second light beam is focused by said converging means beyond said optical recording medium to make a second spot around said recording track;
   first light restriction means provided in a path of said second emitted light beam adjacent said second light emission means for restricting the amount of said second emitted light beam passing there through;
   third light emission means for emitting a third light beam such that said emitted third light beam is focused by said converging means above said optical recording medium to make a third sport around said recording track;
   second light restriction means provided in a path of said third emitted light beam adjacent said third light emission means for restricting the amount of said second emitted light beam passing there through;
   beam guide means for guiding said first, second, and third light beams reflected from said optical recording medium in a second direction;
   first photodetection means inserted in a path of said guided first light beam for receiving said guided first light beam to produce an information signal representing information recorded on said recording track;
   second photodetection means inserted in a path of said guided second light beam for receiving said guided second light beam and producing a first focus signal; and
   third photodetection means inserted in a path of said guided third light beam for receiving said guided third light beam and producing a second focus signal.

* * * * *